Figure 3:
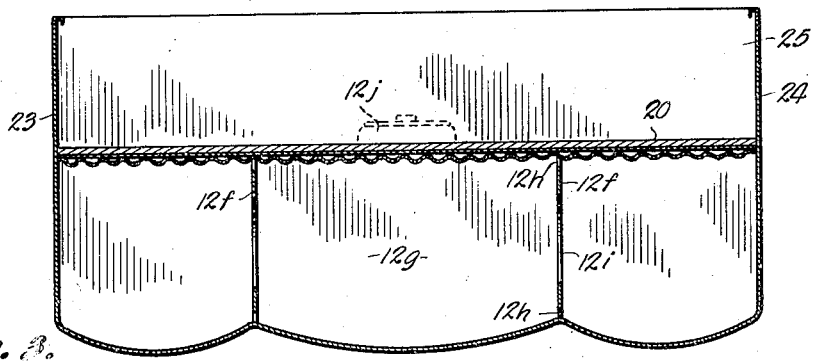

Feb. 20, 1945.  R. D. GEORGE  2,369,890
COMBINATION TRAILER BODY FOR TRUCKS
Filed Dec. 3, 1943  2 Sheets-Sheet 1
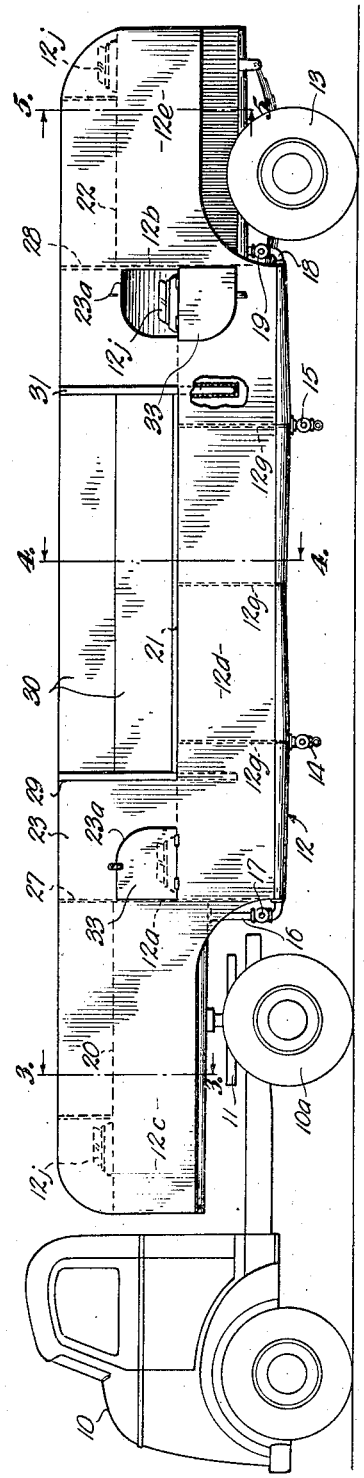
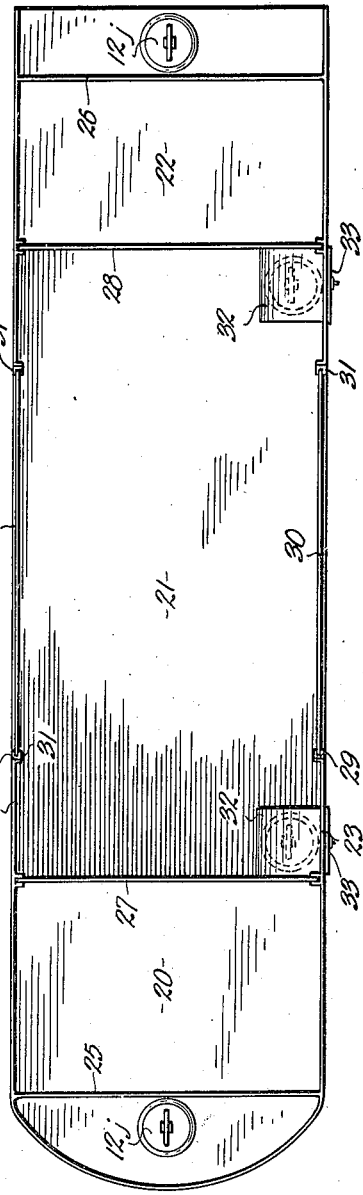
INVENTOR.
Ralph D. George
BY
ATTORNEY.

Feb. 20, 1945.   R. D. GEORGE   2,369,890
COMBINATION TRAILER BODY FOR TRUCKS
Filed Dec. 3, 1943   2 Sheets-Sheet 2

INVENTOR.
Ralph D. George
BY
ATTORNEY.

Patented Feb. 20, 1945

2,369,890

UNITED STATES PATENT OFFICE 2,369,890

COMBINATION TRAILER BODY FOR TRUCKS

Ralph D. George, Raytown, Mo., assignor to Butler Manufacturing Company, Kansas City, Mo., a corporation of Missouri Application December 3, 1943, Serial No. 512,743

5 Claims. (Cl. 280—5)

My invention relates to new and useful improvements in combination truck bodies.

Many jobbing haulers require a truck that will carry both liquid and solid loads. Prior trucks of this type have had a long, rather shallow tank mounted over the trailer wheels and a freight deck or platform above the tank. Liquid loads such as gasoline are carried in the tank while solid loads such as machinery, grain and livestock are carried on the freight deck. The freight deck is usually provided with side and end boards which retain the top load.

The construction heretofore used, however, is impractical in several respects. Firstly, the tank construction permits the liquid load to surge badly; and, secondly, the solid load is so high above the wheels that the vehicle is unstable on the road.

The tanks are large and in order to properly strengthen them they are formed with internal partitions so that the several tank compartments can be easily entered and cleaned. It has heretofore been deemed necessary to arrange these partitions longitudinally of the tank so that the tank can be properly loaded and unloaded. However, the longitudinal partitions make the tank difficult and uneconomical to fabricate and the long compartments permit the liquid to surge badly when the truck goes up or down a hill. As a result, the tank must be made of heavy gauge metal to withstand the impact of the surging liquid. This substantially increases the cost of manufacture. Furthermore, the liquid in the respective compartments must be maintained at a uniform depth in order to keep the trailed body level.

The high center of gravity of the loaded trailer is due to the tank construction which requires that it be mounted high on the trailer chassis. The tank extends the full length of the trailer body to obtain maximum capacity. Since it extends over the trailer wheels it must be mounted sufficiently high to provide ample clearance when fully loaded. This places the freight deck on top of the tank twelve to fifteen inches higher than the conventional freight or loading dock even though the portion of the tank above the wheels is cut away or recessed. This makes the truck difficult to load and raises the center of gravity so that the vehicle is unstable on the road. The instability of the vehicle is aggravated by the fact that the center of gravity of the solid or freight load is not directly over the center of gravity of the liquid load because the freight load has a uniform depth for its entire length while the portion of the tank above the wheels is cut away. The result is that the load distribution is not the same for the two loads.

I propose to obviate the above difficulties by forming the tank in three separate but integrally connected longitudinal sections, the end sections being mounted above the wheels with the intermediate section dropped down and underslung between the wheels. By lowering the intermediate section of the tank its freight deck is brought to subtsantially the level of the conventional loading dock thus making the truck easier to load. Heavy freight can be loaded on the intermediate deck and light goods placed on the raised end decks. The underslung middle section substantially lowers the center of gravity of the loaded trailer making the vehicle much more stable on the road. By making the top of the middle section lower than the tops of the end sections a proper and uniform load distribution is obtained. I am able to divide the tank with horizontal partitions because of a special arrangement of manholes which causes each of the tank compartments to be easily accessible for cleaning. The short tank compartments reduce the effect of liquid surges and maintain the liquid load more evenly distributed when the vehicle travels up or down hills or on highly crowned roads. By making the tank compartments in more normal proportions the tank is easier and more economical to construct.

It may thus be seen that an important object of my invention is to provide a trailer body of the type adapted to carry both solid and liquid loads that are easier to load and more stable on the road.

Another object of my invention is to provide a trailer of the above mentioned character that is simpler and more economical to construct.

Other objects and advantages of my invention will be apparent during the course of the following description.

Figure 4:
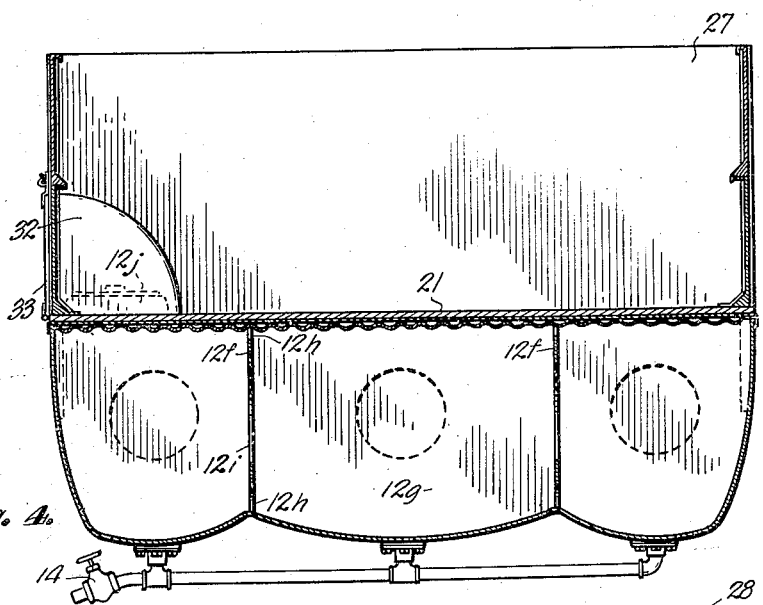
Figure 5:
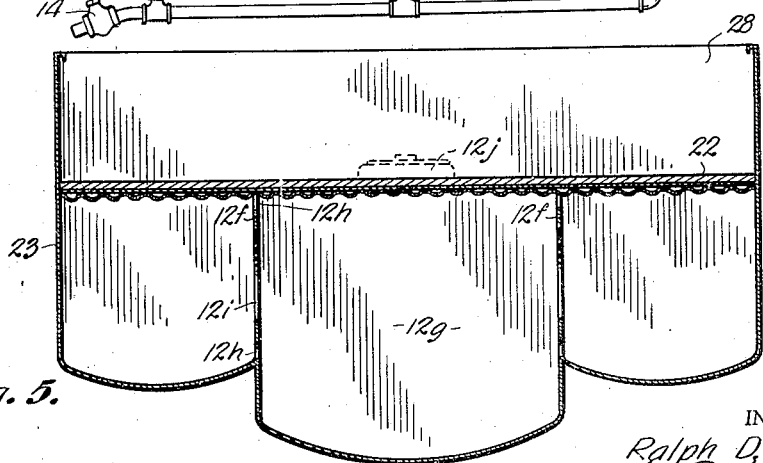

In the drawings forming a part of this specification and wherein like numerals are employed to designate like parts throughout the same, Fig. 1 is a side elevation of a trailer body embodying my invention and showing the same coupled to a suitable truck, Fig. 2 is a top plan view of the trailer body, Fig. 3 is an enlarged vertical sectional view taken on the line 3—3 of Fig. 1, Fig. 4 is an enlarged vertical sectional view taken on the line 4—4 of Fig. 1, and Fig. 5 is a vertical sectional view taken on the line 5—5 of Fig. 1.

In the drawings, wherein for the purpose of illustration is shown a preferred embodiment of my invention, the numeral 10 designates a tractor of the type adapted to pull a large trailer body. In Fig. 1 I have shown a trailer embodying my invention coupled to the tractor 10 at 11. The front end of the trailer is supported directly above the rear wheels 10a of the tractor.

The trailer is formed with a long tank 12 which is divided by transverse partitions 12a and 12b into three compartments 12c, 12d and 12e. The tank compartments are of substantially the same depth but the end compartments 12c and 12e are higher than intermediate compartment 12d. As best shown in Fig. 1, front compartment 12c extends over the rear wheels 10a of the tractor, rear compartment 12e extends over the rear wheels 13 of the trailer and the intermediate compartment 12d is underslung between the front and rear wheels. Liquid is drained from the tank through discharge valves 14 and 15 mounted in the bottom of intermediate compartment 12d. Liquid in the front compartment 12c is drained into the intermediate compartment through a manifold pipe 16 controlled by valve 17 and liquid in the rear compartment 12e is drained into the intermediate compartment through a manifold pipe 18 controlled by valve 19.

The tank compartments are integrally connected to provide a rigid structure. As best shown in Figs. 3, 4, and 5 each compartment is reinforced by longitudinal partitions 12f and the relatively long intermediate compartment is further reinforced by transverse partitions 12g. Each of the reinforcing partitions is provided with openings 12h through which liquids and gases or vapors pass and relatively larger openings 12i through which workmen have access to the various sections of the tank compartments. Workmen enter the respective compartments through manholes 12j. By raising the end compartments 12c and 12e ample clearance is provided for wheels 10a and 13 and the center of gravity of the loaded tanks is substantially low. Surmounting the respective tank compartments 12c, 12d and 12e are freight decks 20, 21 and 22. At each side of the freight decks are vertical side boards 23 and 24. Extending transversely between the side boards and adjacent the end most manholes 12j are end boards 25 and 26. The freight decks are preferably separated by transverse partitions 27 and 28. The side boards 23 and 24 are cut away, as at 29, to substantially the level of deck 21 to facilitate loading the trailer. The openings 29 are normally closed by gates or panels 30 which slide in vertical channels 31 at each end of openings 29. Hoods 32 cover and protect the intermediate manholes 12j, access being had to the manholes through openings 23a in side board 23. Openings 23a are normally closed by hinged covers 33.

By constructing the tank 12 so that intermediate compartment 12d is underslung between front wheels 10a and rear wheels 13, its feight deck 21 is brought to substantially the same level as conventional loading docks, thus facilitating transfer of freight to the trailer. Moreover, this unique tank construction materially lowers its center of gravity when the trailer is loaded making the vehicle more stable on the road. It will be observed that when a load, such as wheat, is carried on the freight decks it assumes substantially the shape of the tank. This permits proper load distribution. In addition to the above the unique disposition of manholes 12j permits the tank to be divided by transverse partitions so that the respective compartments are relatively short. This greatly reduces any tendency of the liquid to surge within the tanks and permits it to be made of lighter weight material facilitating fabrication of the tank and obtaining a substantial saving in the cost of construction.

It is to be understood that the form of the invention herewith shown and described is to be taken as a preferred example of the same and that various changes in the size, shape and arrangement of parts may be resorted to without departing from the spirit of my invention or the scope of the appended claims.

Having thus described my invention, I claim:

1. In a trailer vehicle, the combination of a lower tank portion divided by transverse partitions into front, rear and intermediate compartments, the latter compartment extending substantially below the front and rear compartments and having its top surface at a substantially lower level than the top surface of said front and rear compartments, and an upper freight carrying deck surmounting each of the tank compartments.

2. In a trailer vehicle, the combination of a lower tank portion divided by transverse partitions into front, rear and intermediate compartments, the latter compartment extending substantially below the front and rear compartments and having its top surface at a substantially lower level than the top surface of said front and rear compartments, an upper freight carrying deck surmounting the tank, and front, rear and side walls extending to a selected height above the freight deck, whereby the portion of the freight deck overlaying the intermediate tank compartment is relatively deep, while the portions overlaying the front and rear tank compartments are relatively shallow.

3. In a trailer vehicle, the combination of a lower tank portion divided by transverse partitions into front, rear and intermediate compartments, the latter compartment extending substantially below the front and rear compartments and having its top surface at a substantially lower level than the top surface of said front and rear compartments, an upper freight carrying deck surmounting the tank, front, rear and side walls extending to a selected height above the freight deck, and transverse panels separating the portions of the freight deck overlaying the front and rear tank compartments from the portion thereof overlaying the intermediate tank compartment.

4. In a trailer vehicle, the combination of a lower tank portion divided by transverse partitions into relatively small front and rear compartments and a relatively large intermediate compartment, the latter compartment extending substantially below the front and rear compartments and having its top surface at a substantially lower lever than the top surfaces of the front and rear compartments to lower the center of gravity of the truck substantially below the centers of said end compartments, an upper freight carrying deck surmounting the tank, and front, rear and side walls extending to a selected height above the freight deck.

5. In a trailer vehicle, the combination of a lower tank portion divided by transverse partitions into front, rear and intermediate compartments, the latter compartment extending substantially below the front and rear compartments and having its top surface at a substantially lower level than the top surface of said front and rear compartments, perforate partitions dividing the intermediate tank portion transversely to inhibit surging of the liquid therein when the tank is tilted, an upper freight carrying deck surmounting the tank, and front, rear and side walls extending to a selected height above the freight deck.

RALPH D. GEORGE.